(12) United States Patent
Bezile

(10) Patent No.: US 8,590,647 B2
(45) Date of Patent: Nov. 26, 2013

(54) WHEELCHAIR TOW DEVICE

(76) Inventor: Randall J. Bezile, Holland, MI (US)

(*) Notice: Subject to any disclaimer, the term of this patent is extended or adjusted under 35 U.S.C. 154(b) by 0 days.

(21) Appl. No.: 13/226,052

(22) Filed: Sep. 6, 2011

(65) Prior Publication Data

US 2012/0090904 A1    Apr. 19, 2012

Related U.S. Application Data

(63) Continuation-in-part of application No. 12/760,192, filed on Apr. 14, 2010, now abandoned, which is a continuation of application No. 12/583,653, filed on Aug. 24, 2009, now abandoned, which is a continuation of application No. 12/074,233, filed on Feb. 29, 2008, now abandoned, which is a continuation of application No. 11/827,561, filed on Jul. 12, 2007, now abandoned.

(60) Provisional application No. 60/830,170, filed on Jul. 12, 2006.

(51) Int. Cl.
*A61G 5/10* (2006.01)
*B62D 49/00* (2006.01)
*B62D 51/00* (2006.01)

(52) U.S. Cl.
USPC ........... 180/11; 180/12; 180/19.1; 280/288.4; 280/304.1

(58) Field of Classification Search
USPC ................ 180/11, 12, 16, 19.1, 19.2, 19.3; 280/304.1, 288.4
See application file for complete search history.

(56) References Cited

U.S. PATENT DOCUMENTS

| | | | | |
|---|---|---|---|---|
| 3,704,758 A * | 12/1972 | Cropp | | 180/19.1 |
| 5,050,695 A * | 9/1991 | Kleinwolterink, Jr. | | 180/13 |
| 5,259,471 A * | 11/1993 | Taylor et al. | | 180/12 |
| 5,439,069 A * | 8/1995 | Beeler | | 180/11 |
| 5,494,126 A * | 2/1996 | Meeker | | 180/13 |
| 5,573,078 A * | 11/1996 | Stringer et al. | | 180/19.2 |
| 5,651,422 A * | 7/1997 | Casali | | 180/13 |
| 6,070,679 A * | 6/2000 | Berg et al. | | 180/19.2 |
| 6,481,514 B2 * | 11/2002 | Takada | | 180/11 |
| 6,938,711 B2 * | 9/2005 | Kime et al. | | 180/11 |
| 7,174,093 B2 * | 2/2007 | Kidd et al. | | 388/811 |
| 7,712,558 B2 * | 5/2010 | Helson et al. | | 180/19.3 |
| 8,430,189 B2 * | 4/2013 | Tallino | | 180/11 |
| 2004/0213656 A1 * | 10/2004 | Lear | | 414/495 |
| 2011/0209931 A1 * | 9/2011 | Butts et al. | | 180/12 |

* cited by examiner

*Primary Examiner* — Kevin Hurley
*Assistant Examiner* — Marc A Scharich
(74) *Attorney, Agent, or Firm* — King & Partners, PLC

(57) ABSTRACT

A wheelchair tow device which includes a frame sub-assembly, at least one front ground engaging wheel, at least one rear ground engaging wheel, a motive source capable of rotating at least one of the at least one front ground engaging wheel and the at least one rear ground engaging wheel, an energy storage device, wherein the energy storage device is in electrical communication with the motive source, and a handle assembly.

18 Claims, 8 Drawing Sheets

WHEELCHAIR TOW DEVICE

CROSS-REFERENCE TO RELATED APPLICATION(S)

This application is a continuation-in-part of U.S. patent application Ser. No. 12/760,192 entitled "Wheelchair Tow Device" filed Apr. 14, 2010 now abandoned, which is a continuation of U.S. patent application Ser. No. 12/583,653 entitled "Wheelchair Tow Device" filed Aug. 24, 2009 now abandoned, which is a continuation of U.S. patent application Ser. No. 12/074,233 entitled "Wheelchair Tow Device" filed Feb. 29, 2008 now abandoned, which is a continuation of U.S. patent application Ser. No. 11/827,561 entitled "Wheelchair Tow Device" filed Jul. 12, 2007 now abandoned, which claims the benefit of U.S. Provisional Application Ser. No. 60/830,170 filed Jul. 12, 2006, all of which are hereby incorporated by reference in their entirety.

BACKGROUND OF THE INVENTION

1. Field of the Invention

The present invention relates in general to a wheelchair tow device and, more particularly, to a wheelchair tow device which facilitates improved mobility of a physically and/or mentally impaired individual.

2. Background Art

Wheelchairs have been known in the art for several years. While wheelchairs have been known in the art, issues relative to improving mobility of a user remains largely problematic. In particular, many physically and/or mentally impaired individuals do not participate in activities enjoyed by those without a physical and/or mental impairment. For example, physically impaired individuals often avoid shopping, participating in family walks, attending sporting events, theme parks, amusement parks, carnivals as well as numerous other activities because, among other reasons, the impaired individual encounters physical challenges taken for granted by others—such as extreme fatigue associated with traveling long distances, traveling across inclines, declines, rough terrain just to name a few.

It is therefore an object of the present invention to provide a wheelchair tow device which, among other things, remedies the aforementioned detriments and/or complications associated with the use of conventional wheelchairs.

These and other objects of the present invention will become apparent in light of the present specification, claims, and drawings.

SUMMARY OF THE INVENTION

In one embodiment, the present invention is directed to a wheelchair tow device, comprising: (a) a frame sub-assembly; (b) at least one front ground engaging wheel, wherein the at least one front ground engaging wheel is rotatably connected to the frame sub-assembly and positioned substantially coplanar with a first horizontal plane; (c) at least one rear ground engaging wheel, wherein the at least one rear ground engaging wheel is associated with the frame sub-assembly and positioned substantially coplanar with a second horizontal plane, wherein the second horizontal plane is positioned below the first horizontal plane; (d) a motive source capable of rotating at least one of the at least one front ground engaging wheel and the at least one rear ground engaging wheel; (e) an energy storage device, wherein the energy storage device is in electrical communication with the motive source; and (f) a handle assembly, wherein the handle assembly is pivotally connected to the frame sub-assembly and wherein the handle assembly comprises means for operating the motive source.

In another embodiment, the frame sub-assembly further comprises an extension member for rotatably supporting each of the at least one rear ground engaging wheels in such a way that each of the at least one rear ground engaging wheels may pivot relative the frame sub-assembly to change the trajectory of the wheelchair tow device during translation of the same.

In yet another embodiment, the wheelchair tow device comprises at least two front ground engaging wheels, wherein the at least two front ground engaging wheels comprise a center of rotation wherein the center of rotation of the at least two front ground engaging wheels is positioned substantially coplanar with the first horizontal plane.

In an additional embodiment, the frame sub-assembly further comprises a main plate and a motive source plate, wherein the motive source plate extends from the main plate at an obtuse angle.

In one embodiment, the wheelchair tow device further comprises an axle, rotatably supported by at least one of the frame sub-assembly and the motive source plate and wherein the axle is connected to the at least one front ground engaging wheel, and means for connecting the axle to the motive source.

In another embodiment, the motive source is an electric motor.

In an additional embodiment, means for connecting the axle to the motive source includes: (i) at least one gear associated with the axle; (ii) an output shaft connected to the motive source; and (iii) a drive member operatively connecting the at least one gear associated with the axle with the output shaft connected to the motive source.

In yet another embodiment, the drive member comprises a chain.

In one embodiment, the energy storage device comprises an electrochemical cell, wherein the electrochemical cell comprises at least one of an alkaline, a lead acid, a nickel-cadmium, a nickel metal hydride, a lithium-ion, and a lithium-ion polymer electrochemical cell.

In accordance with the present invention, the wheelchair tow device further comprises a charging port, wherein the charging port is in electrical communication with the energy storage device.

In yet another embodiment, the wheelchair tow device further comprises an electronic control module, wherein the electronic control module comprises: (i) a speed regulator module, wherein the speed regulator module controls the rotation of the output shaft; and (ii) a throttle control module.

In an additional embodiment, the handle assembly further comprises: (i) a brake actuator, wherein the brake actuator is in at least one of mechanical and electrical communication with a brake member, and wherein the brake member is associated with the at least one front ground engaging wheel; and (ii) a directional switch.

In one embodiment, the electronic control module is in electrical communication with at least one of the energy storage device, the motive source, means for operating the motive source, and the brake actuator.

In accordance with the present disclosure, the motive source is in electrical communication with at least one of the drive actuator and the brake actuator via the electronic control module.

In an additional embodiment, the directional switch controls the direction of rotation of the output shaft of the motive source.

In yet another embodiment, the directional switch comprises a toggle switch, wherein the toggle switch comprises a forward position and a reverse position.

In one embodiment, the wheelchair tow device further comprises an ignition member, wherein the ignition member is in electrical communication with the electronic control module, and wherein the ignition member comprises a start position and a stop position.

In an additional embodiment, the wheelchair tow device further comprises a cover member, wherein the cover member is associated with the frame sub-assembly, such that the cover member and the frame sub-assembly cooperate to form a substantially polygonal housing.

In accordance with the present disclosure at least one of the motive source, the electronic control module, and the energy storage device are at least partially contained within the cover member.

In one embodiment, the wheelchair tow device further comprises a receptacle releaseably connectable to the frame sub-assembly.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

The invention will now be described with reference to the drawings wherein.

DETAILED DESCRIPTION OF THE INVENTION

Figure 1:
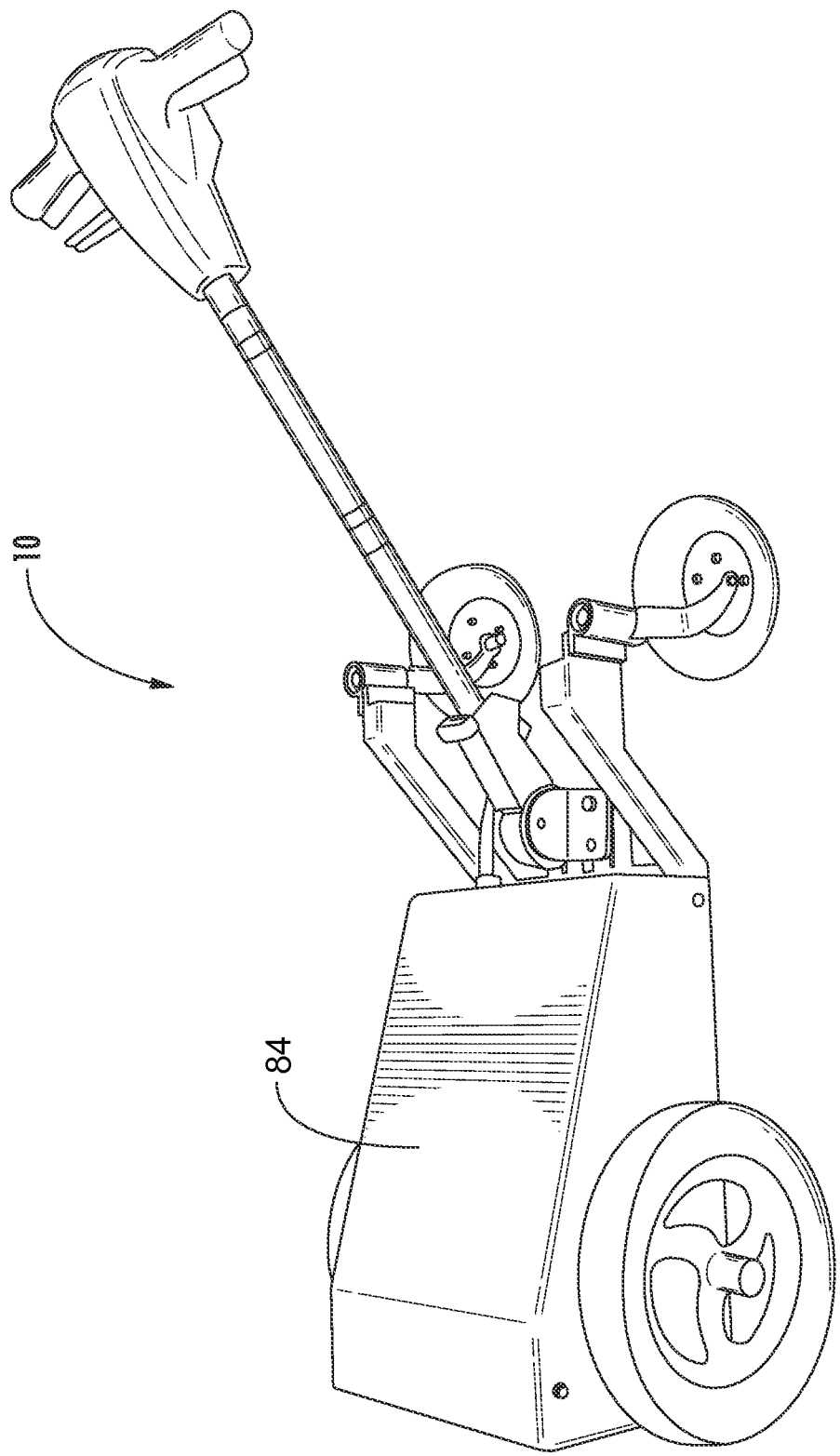
FIG. 1 of the drawings is a perspective view of a wheelchair tow device constructed in accordance with the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 2:
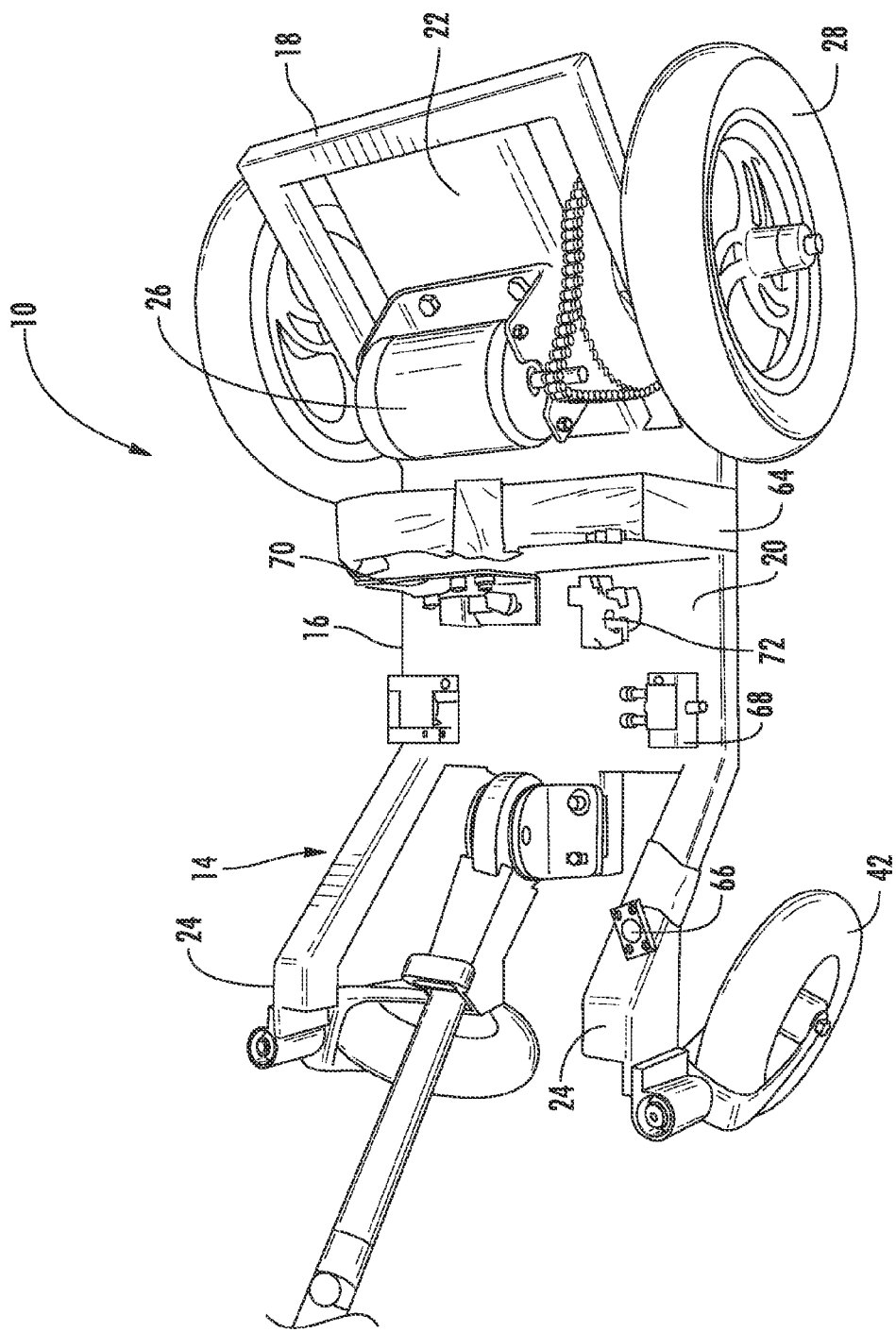
FIG. 2 of the drawings is a partial perspective view of the wheelchair tow device of FIG. 1 shown without a cover.

Referring now to the drawings, and to FIGS. 1 and 2 in particular, shown therein is a perspective view of wheelchair tow device, hereinafter referred to as device 10. In one embodiment, device 10 is shown in a non-limiting application, pulling an individual in a wheelchair. Device 10 preferably comprises frame sub-assembly, hereinafter referred to as frame 14 that is preferably fabricated from a strong and rigid material such as a metal, or metallic alloy, a plastic, resin, composite, or combination thereof, although any one of a number of materials that would be known to one of ordinary skill in the art with the present disclosure before them are likewise contemplated for use in accordance with the present invention.

Frame 14 preferably comprises base portion 16 and angled portion 18 that extends from base portion 16 at an obtuse angle allowing for the front and rear ground engaging wheels of device 10 to be positioned in a non-coplanar relationship, as will be discussed in greater detail below.

Frame 14 also includes main plate 20, motive source plate 22, and extension members 24. Main plate 20 is connected to base portion 16 of frame 14 and supports various components of device 10 as will be discussed in greater detail below. In one embodiment, motive source plate 22 is connected to angled portion 18 of frame 14 and provides support for motive source 26 such as an electric motor.

Figure 3:
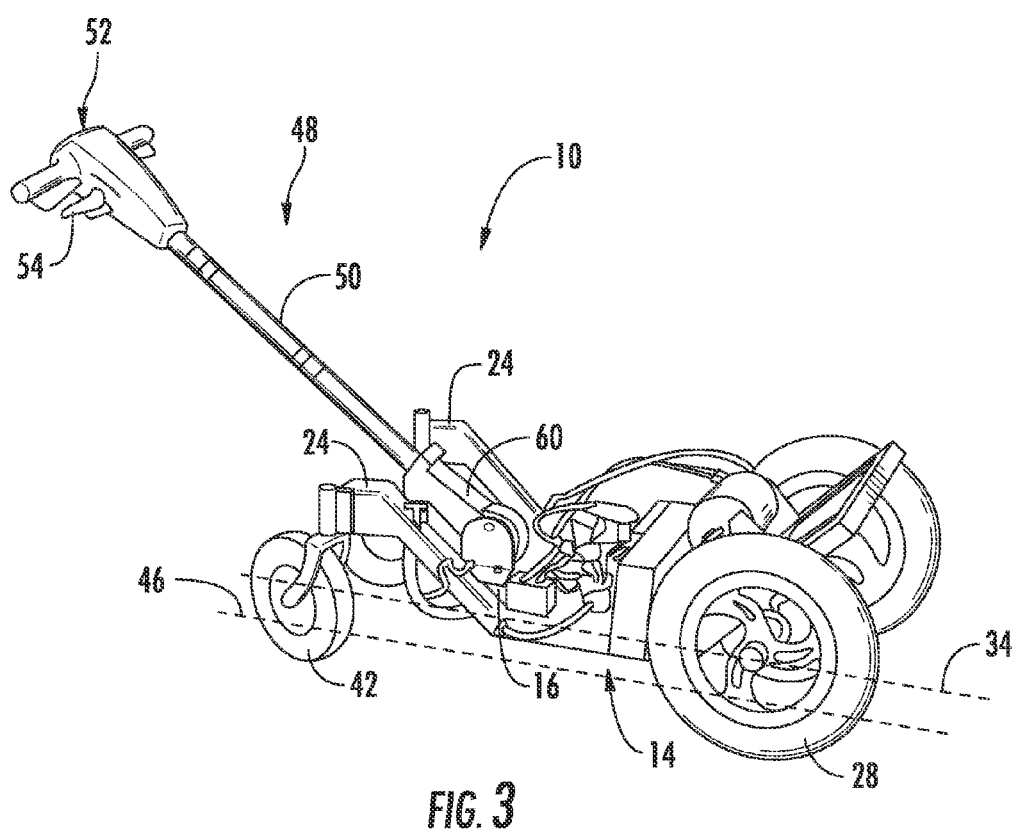
FIG. 3 is a side perspective view of the wheelchair tow device of FIGS. 1 and 2.
Figure 4:
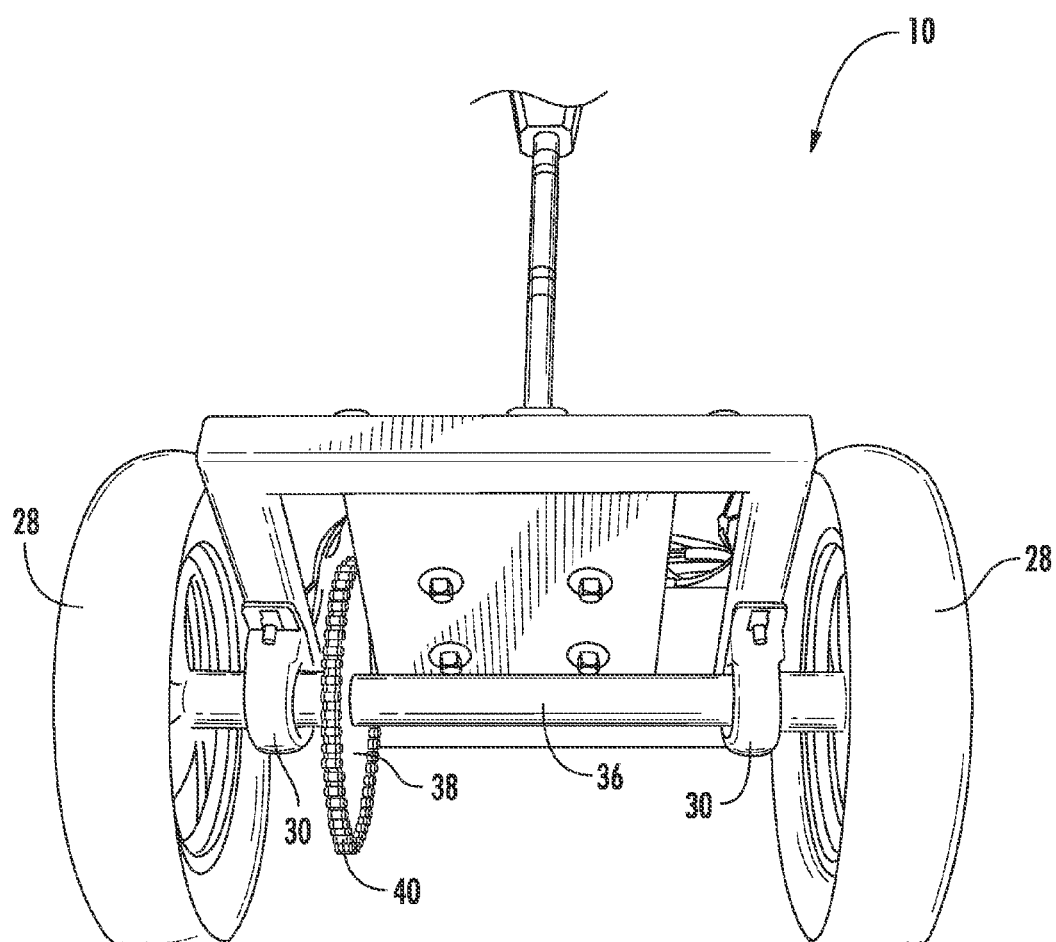
FIG. 4 of the drawings is a bottom perspective view of the front end of the wheelchair tow device of FIGS. 1-3.

Referring now to FIGS. 3 and 4 collectively, front ground engaging wheels 28 are rotatably connected to angled portion 18 of frame 14 via bearing supports 30. More specifically, front ground engaging wheels 28 are rotatably supported on angled portion 18 of frame 14 such that centers of rotation of front ground engaging wheels 28 are positioned substantially coplanar with first horizontal plane 34. Front ground engaging wheels 28 are preferably connected together via axle 36 which is operatively connected to motive source 26 via gear 38 and drive member 40.

In one embodiment, motive source 26 includes an output shaft (not shown) that is operatively connected to gear 38 via drive member 40 such as a chain, belt, gears, or the like. Drive member 40 transfers rotational forces from motive source 26 to axle 36 to rotate front ground engaging wheels 28.

In accordance with the present disclosure, device 10 may preferably comprise one or more rear ground engaging wheels 42. Rear ground engaging wheels 42 are preferably connected to at least one of base portion 16 and extension members 24 in such a way that front ground engaging wheels may freely pivot a full 360-degree range for steering device 10 during translation.

It will be understood that rear ground engaging wheels 42 have centers of rotation that are positioned substantially coplanar with second horizontal plane 46 when rear ground engaging wheels 42 are joined to frame 14. It will further be understood that second horizontal plane 46 is preferably positioned below first horizontal plane 34 such that the centers of rotation of front ground engaging wheels 28 are positioned above the centers of rotation of rear ground engaging wheels 42 as the diameter of front ground engaging wheels 28 is greater than the diameter of rear ground engaging wheels 42. The difference in diameters between front ground engaging wheels 28 and rear ground engaging wheels 42 increases the traction of front ground engaging wheels 28.

Figure 5:
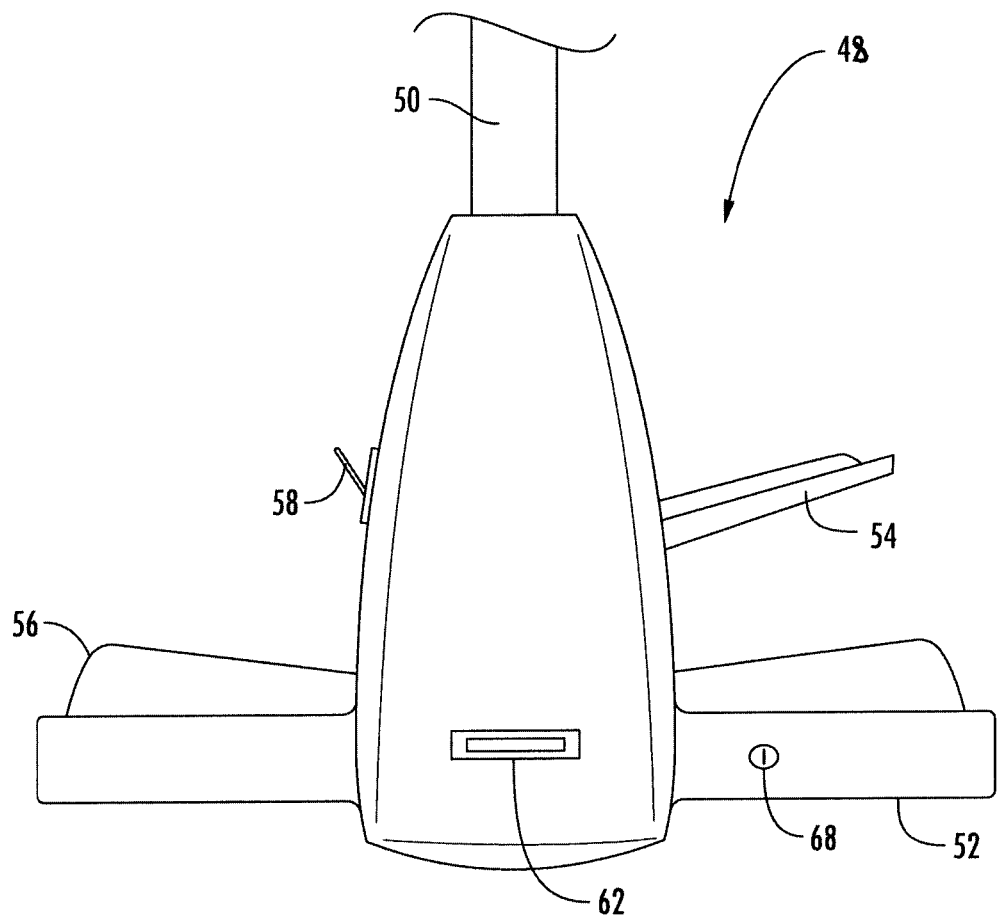
FIG. 5 is a top down view of a portion of a handle assembly of the wheelchair tow device.

Referring now to FIG. 5, handle assembly 48 is shown as comprising extension 50, handle 52, throttle 54, brake actuator 56, and directional switch 58. Handle assembly 48 is shown as pivotally connected to frame 14 by extension 50. More specifically, extension 50 pivotally connects to frame bracket 60 which is releaseably secured to base portion 16 of frame 14. The pivotal connection of handle assembly 48 to frame 14 allows handle assembly 48 to be positioned in a variety of vertical configurations. In one embodiment, extension 50 is a tubular member that is configured to provide a passage for enclosing electrical wiring between handle 52 and various parts of device 10 located proximate frame 14. It will be understood that the electrical wiring preferably connects throttle 54, brake actuator 56, and/or directional switch 58 to an electronic control module, as will be discussed in greater detail below.

In one embodiment, throttle 54 comprises a simple handle, which, when engaged causes motive source 26 of device 10 to rotate front ground engaging wheels 28.

Brake actuator 56 is utilized to stop and/or slow device 10. In one embodiment, brake actuator 56 comprises a simple hand brake that electrically communicates with motive source 26 to vary the speed of motive source 26. Although not shown, brake actuator 56 may likewise include a conventional hand brake which operates brake pads and rotors associated with at least one of front ground engaging wheels 28 and rear ground engaging wheels 42. As one of ordinary skill in the art will appreciate the incorporation, utilization, and/or operation of conventional hand brakes, a detailed discussion thereof will not be provided.

Directional switch 58 is provided for changing the translation of device 10 from forward to backward or vice versa by changing the direction of rotation of front ground engaging wheels 28. In one embodiment, directional switch 58 comprises a toggle switch having two positions, a forward position and a reverse position.

Also, to enhance safety, device 10 may preferably further comprise battery level indicator 62. Battery level indicator 62 preferably provides a visual representation of the level of electrical energy remaining in energy storage device 64. Battery level indicator 62 may preferably comprise, for example, a series of LED lights, which illuminate to display the current energy level of energy storage device 64.

Referring back to FIG. 2 collectively, energy storage device 64 provides power to motive source 26. In one embodiment, energy storage device 64 preferably comprises a series of rechargeable electrochemical cells comprised of at least one of, for example, an alkaline, a lead acid, a nickel-cadmium, a nickel metal hydride, a lithium-ion, and a lithium-ion polymer electrochemical cell. Energy storage device 64 preferably electrically communicates with charging port 66 to recharge when needed. Charging port 66 preferably comprises any one of a number of charging interfaces. The type of charging interface preferably depends on the type of battery being charged and the charging source (i.e. standard home outlet of 110 volt or 220 volt, 12 volt car charger etc.). Energy storage device 64 is preferably mounted to main plate 20 via any number of commonly known methods.

Device 10 may preferably further comprise ignition 68, which allows device 10 to be turned on and off. Ignition 68 may comprise, for example, a key and tumbler system, although other types of ignitions which would be known to one of ordinary skill in the art with the present disclosure before them are likewise contemplated for use in accordance with the present invention. When ignition 68 is in the on position electrical energy can flow from energy storage device 64 to motive source 26 of device 10. In one embodiment, ignition 68 may be incorporated into handle 52.

Figure 6:
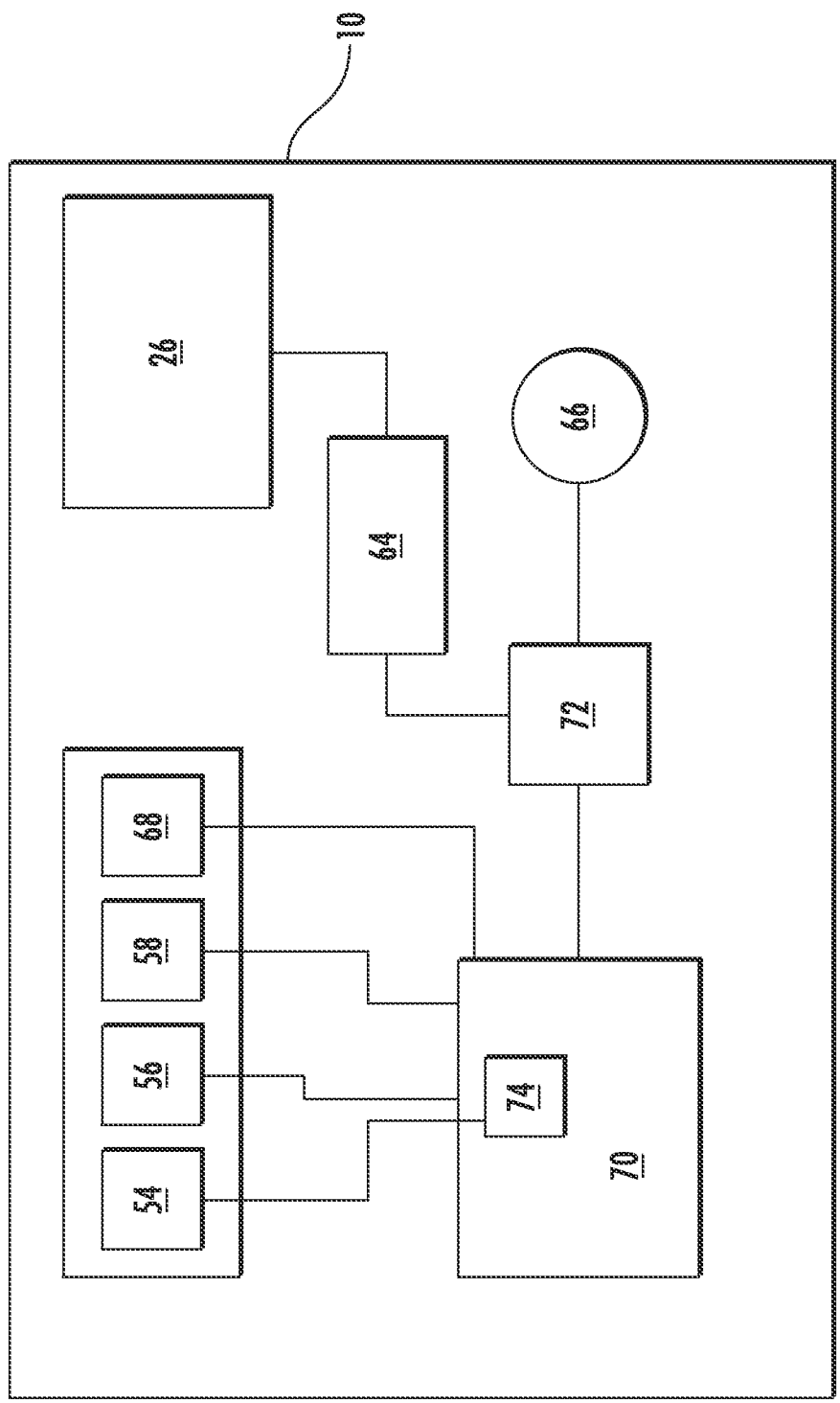
FIG. 6 is a schematic representation of various components of the wheelchair tow device.

Referring now to FIG. 6, shown therein is a schematic representation of the interaction of various electrical components of device 10. The control of various electrical components of device 10 is preferably orchestrated by electronic control module, hereinafter referred to as ECM 70. ECM 70 is in electrical communication with DC contactor 72 which can open and close electrical circuits and allow or refuse current to flow through charging port 66, energy storage device 64, ECM 70, and motive source 26.

ECM 70 receives signals from throttle 54 and break actuator 56 for controlling the rotation of front ground engaging wheels 28. That is, when ignition 68 is in the on position, DC contactor 72 allows current to flow to ECM 70 and receive signals from throttle 54 and brake actuator 56 to rotate or stop front ground engaging wheels 28.

In one embodiment, ECM 70 preferably comprises speed controller 74 which cooperates with throttle 54 to vary the rate of rotation of front ground engaging wheels 28. That is, throttle 54 may include a trigger that is selectively positionable between still position and a full throttle position such that selectively moving throttle 54 from the still position to the full throttle position causes motive source 26 to rotate at a greater rate thereby causing front ground engaging wheels 28 to rotate at a greater rate. Selectively moving throttle 54 from the full throttle position to the still position causes an opposite effect, slowing the rate of rotation of motive source 26.

ECM 70 is also in electrical communication with directional switch 58 to control the direction of rotation of motive source 26 as discussed above. Additionally, ECM 70 controls the flow of electrical current into energy storage device 64 via charging port 66. That is, when charging port 66 is connected to a current source, ECM 70 directs current to flow into energy storage device 64 to recharge the same.

To protect the various electrical and/or mechanical components of wheelchair tow device 10, wheelchair tow device 10 may preferably further comprise cover member 84. Cover member 84 is associated with frame 14, such that when cover member 84 and frame 14 are associated they preferably cooperate to form a substantially polygonal housing for at least partially containing ECM 70 and/or energy storage device 64, protecting them from external contamination.

Figure 7:
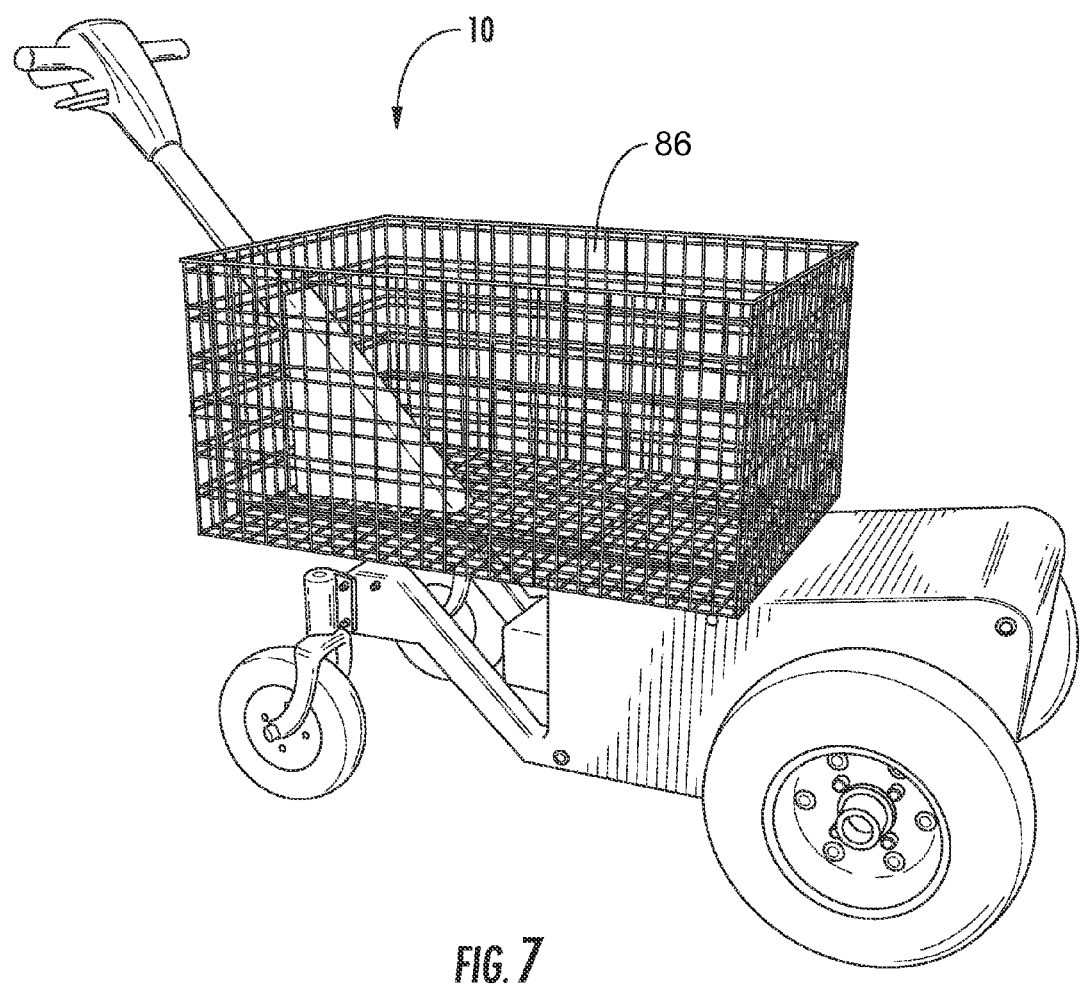
FIG. 7 is a perspective view of a wheelchair tow device in combination with a shopping cart.

Referring now to FIG. 7, an alternative embodiment of device 10 is shown with related accessories. In this embodiment, device 10 is shown as comprising first, second, third and fourth walls. These walls cooperate to define cavity 86, and may preferably comprise a lattice type material and resemble a standard shopping cart.

Figure 8:
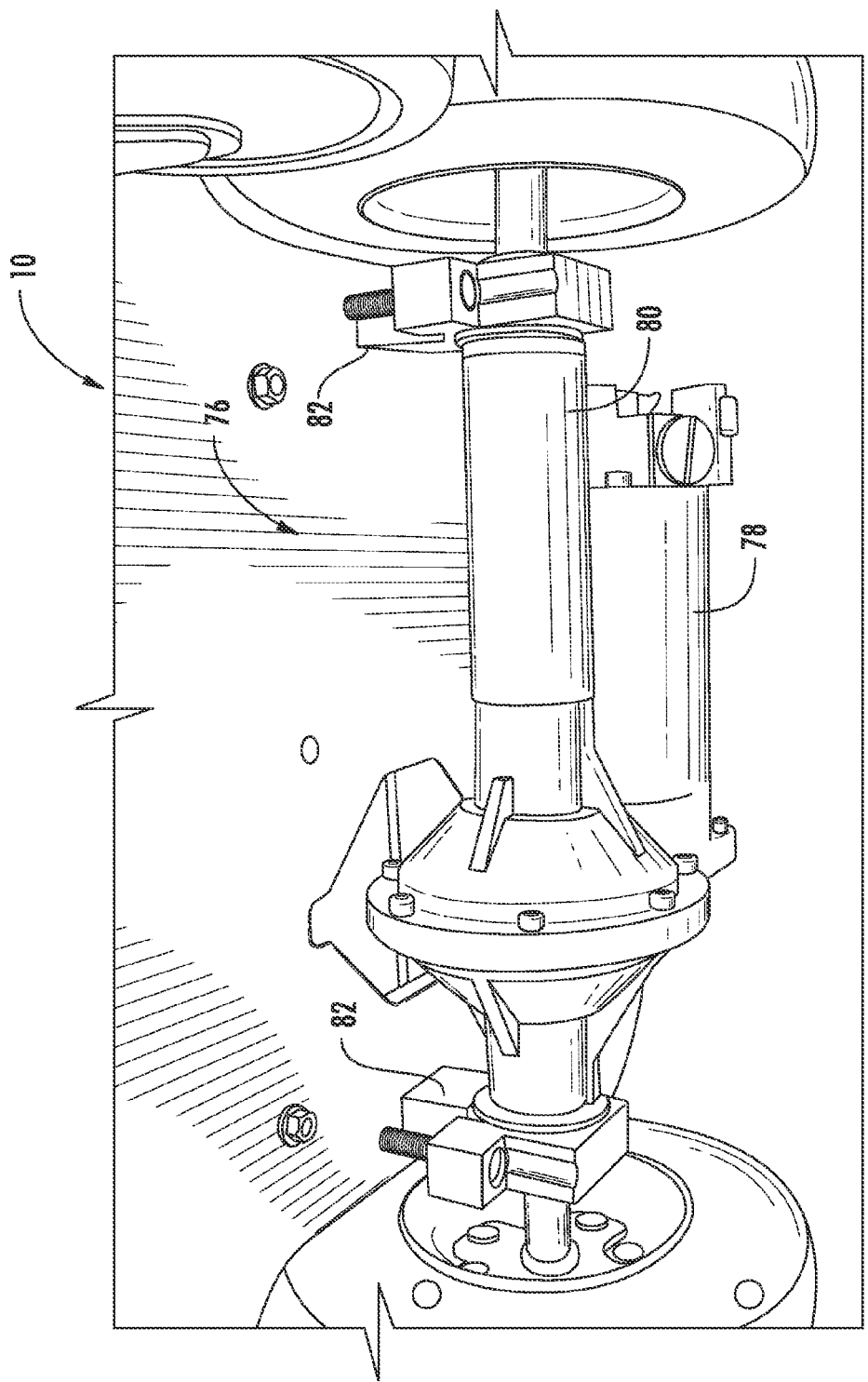
FIG. 8 is a bottom perspective view of the front end of an alternative embodiment of a wheelchair tow device.

Referring now to FIG. 8, shown therein is an alternative embodiment of device 10 having motive assembly 76 that includes motive source 78 in combination with axle 80, joined to frame 14 via support blocks 82.

The foregoing description merely explains and illustrates the invention and the invention is not limited thereto except insofar as the appended claims are so limited, as those skilled in the art who have the disclosure before them will be able to make modifications without departing from the scope of the invention.

What is claimed:

1. A wheelchair tow device for propelling a wheelchair while occupied by a user, the wheelchair tow device comprising:
   a frame sub-assembly;
   driven front ground engaging wheels rotatably connected to the frame sub-assembly and rotatable about a horizontal axis;
   non-driven rear ground engaging wheels pivotably connected to the frame sub-assembly about vertical pivot axes and rotatable about horizontal axes;
   a motive source for driving the front ground engaging wheels;
   an energy storage device, wherein the energy storage device is in electrical communication with the motive source;
   a charging port in electrical communication with the energy storage device to facilitate recharging of the energy storage device;

a cover member attached to the frame sub-assembly, wherein at least the motive source and the energy storage device are contained within the cover member;

a handle assembly for being gripped by the user during propulsion and translation of the wheelchair tow device, wherein the handle assembly is pivotally connected to the frame sub-assembly, and wherein the handle assembly comprises means for operating the motive source and means for braking and controlling a direction of the wheelchair tow device; and wherein the rear ground engaging wheels are each located substantially rearward of a location where the handle assembly is pivotally connected to the frame sub-assembly.

2. The wheelchair tow device according to claim 1, wherein the frame sub-assembly further comprises a main plate and a motive source plate, wherein the motive source plate extends from the main plate at an obtuse angle.

3. The wheelchair tow device according to claim 2, further comprising an axle rotatably supported by at least one of the frame sub-assembly and the motive source plate and wherein the axle is connected to the front ground engaging wheels, and further comprising means for connecting the axle to the motive source.

4. The wheelchair tow device according to claim 3, wherein the means for connecting the axle to the motive source includes:

at least one gear associated with the axle;
an output shaft connected to the motive source; and
a drive member operatively connecting the at least one gear with the output shaft connected to the motive source.

5. The wheelchair tow device according to claim 4, wherein the drive member comprises a chain.

6. The wheelchair tow device according to claim 4, wherein the wheelchair tow device further comprises an electronic control module, wherein the electronic control module comprises:

a speed regulator module, wherein the speed regulator module controls rotation of the output shaft of the motive source; and
a throttle control module.

7. The wheelchair tow device according to claim 6, if wherein the wheelchair tow device further comprises an ignition member, wherein the ignition member is in electrical communication with the electronic control module, and wherein the ignition member comprises a start position and a stop position.

8. The wheelchair tow device according to claim 6, wherein the means for operating the motive source further comprises:

a drive actuator; and
wherein the means for braking and controlling a direction of the wheelchair tow device further comprises:
a brake actuator, wherein the brake actuator is in at least one of mechanical and electrical communication with a brake member, and wherein the brake member is associated with the front ground engaging wheels; and
a directional switch.

9. The wheelchair tow device according to claim 8, wherein the electronic control module is in electrical communication with at least one of the energy storage device, the motive source, the drive actuator, and the brake actuator.

10. The wheelchair tow device according to claim 9, wherein the motive source is in electrical communication with at least one of the drive actuator and the brake actuator via the electronic control module.

11. The wheelchair tow device according to claim 8, wherein the directional switch controls a direction of rotation of the output shaft of the motive source.

12. The wheelchair tow device according to claim 11, wherein the directional switch comprises a toggle switch, wherein the toggle switch comprises a forward position and a reverse position.

13. The wheelchair tow device according to claim 8, wherein the drive actuator is a throttle.

14. The wheelchair tow device according to claim 1, wherein the frame sub-assembly further comprises an extension member for pivotably supporting each of the rear ground engaging wheels in such a way that each of the rear ground engaging wheels may pivot relative to the frame sub-assembly to change a trajectory of the wheelchair tow device during translation of the wheelchair tow device.

15. The wheelchair tow device according to claim 1, wherein the motive source is an electric motor.

16. The wheelchair tow device according to claim 1, wherein the energy storage device comprises an electrochemical cell, wherein the electrochemical cell comprises at least one of an alkaline, a lead acid, a nickel-cadmium, a nickel metal hydride, a lithium-ion, and a lithium-ion polymer electrochemical cell.

17. The wheelchair tow device according to claim 1, wherein the cover member and the frame sub-assembly cooperate to form a substantially polygonal housing.

18. The wheelchair tow device according to claim 17, wherein the electronic control module is contained within the cover member.

* * * * *